US012624405B2

(12) United States Patent (10) Patent No.: US 12,624,405 B2
Erdmann et al. (45) Date of Patent: May 12, 2026

(54) AGGLOMERATED STONE FOR USE IN AN ELECTRIC FURNACE

(71) Applicant: ThyssenKrupp Steel Europe AG, Duisburg (DE)

(72) Inventors: Ronald Erdmann, Dinslaken (DE); Sören Ellerik, Neukirchen-Vluyn (DE)

(73) Assignee: ThyssenKrupp Steel Europe AG, Duisburg (DE)

( * ) Notice: Subject to any disclaimer, the term of this patent is extended or adjusted under 35 U.S.C. 154(b) by 311 days.

(21) Appl. No.: 18/242,323

(22) Filed: Sep. 5, 2023

(65) Prior Publication Data

US 2024/0102119 A1 Mar. 28, 2024

(30) Foreign Application Priority Data

Sep. 22, 2022 (EP) ..................................... 22197096

(51) Int. Cl.
*C21B 11/10* (2006.01)
*C04B 14/02* (2006.01)
*C04B 28/04* (2006.01)
*C04B 28/08* (2006.01)
*C04B 111/28* (2006.01)

(52) U.S. Cl.
CPC ............ *C21B 11/10* (2013.01); *C04B 14/022* (2013.01); *C04B 28/04* (2013.01); *C04B 28/08* (2013.01); *C04B 2111/28* (2013.01)

(58) Field of Classification Search
CPC ....... C21B 11/10; C04B 14/022; C04B 28/04; C04B 28/08; C04B 2111/28; C04B 2111/00887; C22B 1/245
See application file for complete search history.

(56) References Cited

U.S. PATENT DOCUMENTS

| | | | |
|---|---|---|---|
| 4,827,486 A | 5/1989 | Brotzmann et al. | |
| 5,820,668 A | 10/1998 | Comrie | |
| 8,025,727 B2 * | 9/2011 | Mittelstadt | C22B 7/02 |
| | | | 106/713 |
| 2005/0061207 A1 * | 3/2005 | Liu | C22B 1/245 |
| | | | 106/713 |
| 2008/0250980 A1 | 10/2008 | Mittelstadt et al. | |

FOREIGN PATENT DOCUMENTS

| | | |
|---|---|---|
| CN | 1116240 A | 2/1996 |
| CN | 110079665 A | 8/2019 |
| CN | 110964874 A | 4/2020 |
| CN | 114763583 A | 7/2022 |
| DE | 69607381 T2 | 12/2000 |
| DE | 102004027193 A1 | 12/2005 |
| DE | 102005005691 A1 | 8/2006 |
| EP | 0257450 A2 | 3/1988 |
| WO | 2006084670 A2 | 8/2006 |

OTHER PUBLICATIONS

European Search Report for EP Application No. 22197096.5 mailed Mar. 20, 2023.
1st Chinese Office Action for Application No. 202311230027.5 mailed Jan. 26, 2026.
Chinese Search Report for CN Application No. 2023112300275 mailed Jan. 24, 2026.

* cited by examiner

*Primary Examiner* — Amber R Orlando
*Assistant Examiner* — Anastasia A. Kuvayskaya
(74) *Attorney, Agent, or Firm* — RMCK Law Group PLC

(57) ABSTRACT

This disclosure relates to an agglomerated stone for use in an electric furnace.

11 Claims, No Drawings

AGGLOMERATED STONE FOR USE IN AN ELECTRIC FURNACE

CROSS REFERENCE TO RELATED APPLICATIONS

This application is a U.S. Non-Provisional that claims priority to European Patent Application No. EP 22197096.5, filed Sep. 22, 2022, the entire content of which is incorporated herein by reference.

The invention relates to an agglomerated stone for use in an electric furnace.

Agglomerated stones for use in blast furnaces are known from the prior art, see DE 10 2004 027 193 A1.

In addition to the conventional blast furnace route for the production of pig iron, there is also the route via direct reduction and subsequent smelting of the reduced iron ore (sponge iron) to form pig iron in an electric furnace. Depending on the reducing gas, the sponge iron can be doped with more or with less carbon, particularly with less carbon when hydrogen is used. In order to be able to ensure and maintain existing processes, a minimum content of carbon in the pig iron has proven to be advantageous. For this purpose, carbon can additionally be introduced in the form of coke or coal into the electric furnace, see EP 0 257 450 A2.

In contrast to the prior art, the production of pig iron via the direct reduction plant/smelter route uses agglomerated aggregates comprising carbon-containing materials which enable carburization of the sponge iron, downstream of the direct reduction plant in the smelter, to carbon contents >2.5% of a standard pig iron, so that the pig iron can be processed further into crude steel in downstream LD steelworks without any further pretreatment.

The invention therefore relates to an agglomerated stone for use in an electric furnace, which comprises, in % by weight based on the dry state, 6-15% of a cement binder, 25-60% of a carbon carrier and a metal carrier as remainder.

The composition of the agglomerated stone according to the invention is coordinated in such a way that when the smelting operation is in progress, a carburization of the liquid pig iron by the carbon carrier as well as an additional output of metal or iron by the metal carrier can be effected. The particular composition of agglomerated stones according to the invention makes these stones particularly suitable for the carburization of pig iron in an electric furnace.

In order to bring the agglomerated stone directly into contact with the liquid pig iron, which is preferably to be carburized, during the smelting operation below the liquid slag which forms above the liquid pig iron during the smelting operation, the density of the agglomerated stone is at least 1.90 kg/m$^3$ according to one configuration of the invention. The density of the agglomerated stone is in particular at least 1.950 kg/m$^3$, preferably at least 2.0 kg/m$^3$, preferably at least 2.050 kg/m$^3$, particularly preferably at least 2.10 kg/m$^3$, further preferably at least 2.150 kg/m$^3$.

According to one configuration of the invention, the metal carriers are in the form of ores, residual and/or recycled materials, in particular containing metal. The metal carriers are preferably iron carriers. The ores are not metallic iron, but rather only pure iron oxide that may be contaminated with a little gangue. The preferred iron ores are present in haematitic (Fe$_2$O$_3$), magnetitic (Fe$_3$O$_4$), wustitic (FeO) modification and/or as goethite (FeO(OH)), having a grain size or grain diameter of up to 5 mm, particularly up to 3 mm, preferably up to 2 mm. The in particular metal-containing residual and/or recycled materials occur for example in steel production and processing in the form of filter dusts, blast furnace dusts or mill scale, having a grain size or grain diameter of up to 5 mm. The metal carriers or iron carriers may also be used in the form of dust or dusts having a grain size of less than 1 mm. Alternatively, iron carriers may in particular also only comprise metallic iron instead of oxidic iron.

According to one configuration of the invention, the content of iron in the agglomerated stone is at least 5% by weight in order to promote effective pig iron production. In particular, the content of iron is at least 6% by weight, preferably at least 7% by weight, more preferably at least 8% by weight, particularly preferably at least 10% by weight. It is also possible to adjust the density of the agglomerated stone in a controlled manner by way of the content of iron.

Suitable carbon carriers are in principle all materials having free carbon. According to one configuration of the invention, the carbon carriers are in the form of coke dust, coke slack, coke breeze and/or anthracite coal. Coke dust, coke slack and coke breeze are in particular carbon-containing residual and/or recycled materials. The grain size of the carbon carrier is up to 5 mm, in particular up to 3 mm, preferably up to 2 mm. C carriers having such a grain size can be obtained particularly cost-effectively and can be used in iron production only with difficulty.

According to one configuration of the invention, the content of carbon in the agglomerated stone is at least 25% by weight. The content may in particular be at least 27% by weight, preferably at least 30% by weight, more preferably at least 34% by weight, particularly preferably at least 37% by weight.

In particular, the residual and/or recycled materials used may also be a combination of metal-containing and carbon-containing materials.

The invention makes use of the concept already known per se of cold binding an agglomerated stone without any particular heat treatment with the aid of a cement binder. Depending on the content thereof, the cement binder makes it possible to vary the slag make-up, particularly its proportions of MgO, CaO, SiO$_2$, Al$_2$O$_3$, during the pig iron production by way of the respective proportion of cement in the agglomerated stone. According to one configuration of the invention, the cement binder is Portland cement or blast furnace cement.

According to one configuration of the invention, the agglomerated stone may optionally comprise up to 10% by weight based on the dry state of a setting and solidification accelerator which may be water glass, alumina cement, calcium chloride, an alkali metal salt, particularly an Na salt, or a cellulose adhesive, such as paste.

According to one configuration of the invention, the agglomerated stone has a cylindrical, cuboidal or polygonal shape, in particular a block shape with a polygonal, particularly hexagonal, base area. Agglomerated stones of the type discussed here can be produced using stone-making machines known per se, as used for example for the production of paving stones. Such stone-making machines enable particularly cost-effective production and also contribute to the fact that the agglomerated stones according to the invention can be produced at a particularly favourable price which further increases the economics of their use.

As a "green body", i.e. in the still wet state after it has been shaped, the water content of the agglomerated stone should be less than 25% by weight. The production of earth-moist, crumbly green bodies is simplified in comparison with the processing of solids with a higher moisture content. In addition, limiting the water content of the green bodies avoids the need to drive out excess water in the electric furnace with a high energy consumption.

In order to particularly advantageously increase the surface area and therefore the effective area of the agglomerated stone, it is possible for example to provide at least one opening in the form of a blind hole or preferably a continuous hole in the agglomerated stone.

The agglomerated stone may have an early strength of at least 5 N/mm² after three days and a cold compression strength of at least 10 N/mm², in particular of at least 15 N/mm², after 28 days.

At the same time, the early strength of the constituted agglomerated stone is sufficient to allow them to be transported even shortly after they are produced. This makes it possible for example to stack the agglomerated stones soon after they are formed in a drying room in which they can then be dried particularly effectively.

Agglomerated stones according to the invention can be produced particularly easily. For this purpose, a carbon with direct arc action, known as EAFs (Electric Arc Furnaces), which differ from the functional principle/mode of operation described above and form arcs between the electrode and the metal. This includes the AC electric arc furnace (EAFac), the DC electric arc furnace (EAFdc) and the ladle furnace (LF).

The advantage of using electric reduction furnaces with arc resistance heating (SAFs) is that they are operated with a reducing atmosphere, whereas smelting furnaces with direct arc action (EAFs) are operated with an oxidizing atmosphere. The agglomerated stones according to the invention may thus also be introduced into what are known as EAFs.

The invention is elucidated in more detail below on the basis of exemplary embodiments.

Different mixtures, see Table 1, were shaken in a stone-moulding machine known per se and compressed to form block-shaped agglomerated stones having a hexagonal base area with an edge length of about 25 mm and a height of 90 mm.

TABLE 1

| Agglo | Cement [%] | Carbon carrier [%] | Metal carrier [%] | Density [kg/m³] | C content [% by weight] | Fe content [% by weight] | Strength [N/mm²] | inv. |
|---|---|---|---|---|---|---|---|---|
| 1 | 20 | 70 | 10 | 1.49 | 63 | 7 | 7.46 | no |
| 2 | 15 | 40 | 45 | 1.48 | 36 | 12 | 2.5 | no |
| 3 | 15 | 45 | 40 | 1.8 | 40.5 | 28 | 10.77 | no |
| 4 | 10 | 45 | 45 | 2.1 | 40.5 | 32.9 | 5.2 | yes |
| 5 | 10 | 45 | 45 | 2.05 | 40.5 | 36 | 3.8 | yes |
| 6 | 10 | 40 | 50 | 2.21 | 36 | 38.5 | 6.26 | yes | carrier and a metal carrier are mixed with a binder present as hydraulic cement phase, and optionally with a setting and solidification accelerator, with the provision that the proportion of cement binder in the resultant mixture in the dry state (in % by weight) is 6-15%, the proportion of carbon carrier is up to 25% to 60% and the proportion of setting and solidification accelerators is up to 10%, and the remainder is metal carrier. The resultant mixture is filled into moulds. According to a first process variant, the mixture is then compressed before it is dried. Alternatively, however, it is also possible, instead of compression, to shake the mixture filled into the mould in order for the individual components of the mixture to be distributed and combined in as homogeneous a manner as possible. Optimal properties of the agglomerated stones can therefore be achieved if the compression and shaking are carried out in combination or successively in a suitable manner.

The invention also provides for use of an agglomerated stone constituted according to the invention in an electric furnace.

Possible electric furnaces are all electrically operated smelters. The electric smelter is preferably an electric furnace of the OSBF (Open Slag Bath Furnace) type. This includes electric reduction furnaces, especially SAFs (Submerged Electric Arc Furnaces), which are smelting furnaces with arc resistance heating which form arcs between the electrode and the solid and/or the slag or which heat the solid and/or the slag by means of the Joule effect. In the SAF, the electrode is (or the electrodes are, if there are multiple) immersed in the charge and/or slag. Depending on the functional principle/mode of operation, the electric reduction furnaces can be configured as AC submerged arc furnaces (SAFac) or DC submerged arc furnaces (SAFdc). Alternatively, use can also be made of smelting furnaces The carbon carrier used for all mixtures was coke slack (residual material) having a grain size of up to 3 mm. The metal carrier used for 1 and 4 to 6 was iron-containing dusts (residual materials) having a grain size of up to 3 mm from oxygen steelworks, for 2 was iron-containing residual materials having a grain size of up to 3 mm from blast furnace gas slurries and ladle furnace slag, and for 3 was iron-containing materials having a grain size of up to 3 mm from pig iron desulfurization slag. The cement used for all mixtures in Table 1 was Portland cement.

The moisture of the mixture of the "green bodies" after removal from the stone-moulding machine was between about 14% and about 21% for all agglomerated stones. The strength in Table 1 was determined after drying (24 h in a drying cabinet at 105° C.) and storage for 3 days. The contents of carbon and iron in % by weight were determined on the basis of analysis calculations, familiar to those skilled in the art. The (bulk) density was also determined in each case by the stone weight based on the stone volume.

Agglomerated stones 4 to 6 have a density that is substantially higher than the density of the liquid slag which occurs when iron-containing starting materials are melted, preferably when sponge iron and optionally scrap and slag formers are melted. These agglomerated stones can therefore submerge below the liquid slag during operation of the electric furnace, disintegrate (more) quickly and deliver the carbon directly to the pig iron.

In one exemplary embodiment, 100 kg of sponge iron from a direct reduction which used 100% hydrogen as reducing gas was used in an electric furnace of "SAF" type on a laboratory scale. The total carbon content introduced via the sponge iron was therefore less than 0.30% by weight. Slag formers were added in customary contents. After the solids introduced had completely melted and pig iron and a liquid slag above it were present, about 10 kg of agglomerated stones of type "4" were added, with the result that after the smelting operation there was a carbon content in the iron melt of about 4.3% by weight. Due to the iron content in the agglomerated stone, the output of the pig iron was also increased by up to about 3%. Using agglomerated stones, it is thus possible for example to supply between 30 kg and 45 kg of carbon per tonne of pig iron produced. The basicity of the slag was also changed, which became apparent in an increase of up to about 5 kg in the amount of gangue slag.

The pig iron carburized in this way can then be processed further into crude steel in downstream converters for example in LD steelworks in particular without any further pretreatment.

The invention claimed is:

1. An agglomerated stone for use in an electric furnace, which comprises, in % by weight based on a dry state, 6-15% of a cement binder, 25-60% of a carbon carrier and a metal carrier as remainder, wherein the agglomerated stone has a density of at least 1.90 kg/m$^3$, wherein the content of carbon thereof is at least 25% by weight.

2. The agglomerated stone according to claim 1, wherein the metal carriers are in the form of ores, residual materials and/or recycled materials.

3. The agglomerated stone according to claim 2, wherein the metal carriers have a grain size of up to 5 mm.

4. The agglomerated stone according to claim 3, wherein the content of iron thereof is at least 5% by weight.

5. The agglomerated stone according to claim 4, wherein the carbon carriers are in the form of coke dust, coke slack, coke breeze and/or anthracite coal.

6. The agglomerated stone according to claim 2, wherein the carbon carriers have a grain size of up to 5 mm.

7. The agglomerated stone according to claim 1, wherein the cement binder is Portland cement or blast furnace cement.

8. The agglomerated stone according to claim 7, wherein the agglomerated stone may optionally comprise up to 10% by weight based on the dry state of a setting and solidification accelerator selected from water glass, alumina cement, calcium chloride, an alkali metal salt, or a cellulose adhesive.

9. The agglomerated stone according to claim 8, wherein it has a cylindrical, cuboidal or a block shape with a hexagonal, base area.

10. The agglomerated stone according to claim 9, wherein, as a green body before it is dried, it has a water content of less than 25%.

11. A method of using the agglomerated stone as claimed in claim 9 comprising:

charging the agglomerated stone below a liquid slag into molten pig iron in an electric furnace;

increasing the carbon content of the molten pig iron to more than 2.5 wt. %; and processing the pig iron into crude steel.

* * * * *